US009548633B2

(12) United States Patent
Ogawa et al.

(10) Patent No.: US 9,548,633 B2
(45) Date of Patent: Jan. 17, 2017

(54) STATOR OF MOTOR HAVING TOOTH PORTIONS WITH DIFFERENT WIDTHS

(75) Inventors: Takashi Ogawa, Osaka (JP); Yuichi Yoshikawa, Osaka (JP); Ikuo Ozaki, Shiga (JP); Toshiyuki Tamamura, Shiga (JP); Hirokazu Yamauchi, Wakayama (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 230 days.

(21) Appl. No.: 14/003,122

(22) PCT Filed: Dec. 6, 2011

(86) PCT No.: PCT/JP2011/006829
§ 371 (c)(1),
(2), (4) Date: Sep. 4, 2013

(87) PCT Pub. No.: WO2012/120577
PCT Pub. Date: Sep. 13, 2012

(65) Prior Publication Data
US 2013/0342070 A1    Dec. 26, 2013

(30) Foreign Application Priority Data

Mar. 8, 2011 (JP) ................................. 2011-050283

(51) Int. Cl.
*H02K 1/14* (2006.01)
*H02K 1/16* (2006.01)
*H02K 21/16* (2006.01)

(52) U.S. Cl.
CPC ............. *H02K 1/146* (2013.01); *H02K 1/165* (2013.01); *H02K 21/16* (2013.01); *H02K 2213/03* (2013.01)

(58) Field of Classification Search
CPC .......... H02K 1/14; H02K 1/146; H02K 1/165; H02K 21/16
(Continued)

(56) References Cited

U.S. PATENT DOCUMENTS 1,300,308 A * 4/1919 Walker ................... H02K 47/30
                                                                   310/216.004
2,085,099 A * 6/1937 Jones ........................ H02K 3/12
                                                                   310/208

(Continued)

FOREIGN PATENT DOCUMENTS

JP       1995007896        * 10/1995
JP       2000-037050 A       2/2000

(Continued)

OTHER PUBLICATIONS

Nigo et al., English Translation of JP 2009-254086.*

(Continued)

*Primary Examiner* — Terrance Kenerly
*Assistant Examiner* — Rashad Johnson
(74) *Attorney, Agent, or Firm* — Brinks Gilson & Lione

(57) ABSTRACT

Provided is a stator of a motor which is capable of reducing an iron loss generated in a motor and thereby attaining a high-efficient motor. A stator of a motor comprises a yoke of a tubular shape; and teeth each of which includes an extending portion extending inward in a radial direction of the yoke from the yoke and an increased-width portion formed at a tip end of the extending portion so as to have a greater width than the extending portion in a circumferential direction of the yoke; wherein the extending portion has a narrower portion having a smaller width than a remaining portion of the extending portion.

3 Claims, 8 Drawing Sheets

(58) Field of Classification Search
USPC .................................................. 310/156, 216
See application file for complete search history.

(56) References Cited

U.S. PATENT DOCUMENTS

| | | | | |
|---|---|---|---|---|
| 3,886,256 | A * | 5/1975 | Ohuchi | ..................... H02K 1/16 310/216.043 |
| 5,338,996 | A * | 8/1994 | Yamamoto | ............... H02K 1/26 310/216.048 |
| 5,886,441 | A * | 3/1999 | Uchida | ................ H02K 1/2773 310/156.57 |
| 6,559,572 | B2 * | 5/2003 | Nakamura | ............... H02K 1/16 310/216.071 |
| 2001/0030484 | A1 | 10/2001 | Nakamura | |
| 2003/0127942 | A1 | 7/2003 | Nakamura | |
| 2005/0099086 | A1 | 5/2005 | Schunk et al. | |
| 2005/0194858 | A1 | 9/2005 | Ahn | |
| 2006/0022550 | A1 * | 2/2006 | Otsuji | ........................... 310/216 |
| 2006/0091758 | A1 | 5/2006 | Ahn | |
| 2007/0169335 | A1 * | 7/2007 | Matsuyama | ........ H02K 15/0006 29/596 |
| 2009/0085422 | A1 * | 4/2009 | Kusawake | ............. H02K 1/148 310/216.067 |
| 2010/0045131 | A1 * | 2/2010 | Li | ........................... H02K 29/03 310/156.01 |
| 2010/0320864 | A1 * | 12/2010 | Rahman | ........................ 310/201 |
| 2012/0126651 | A1 * | 5/2012 | Li | ........................... H02K 29/03 310/156.01 |
| 2014/0348673 | A1 * | 11/2014 | Tamamura | ............. H02K 1/165 417/410.1 |

FOREIGN PATENT DOCUMENTS

| | | | |
|---|---|---|---|
| JP | 2001-359246 | A | 12/2001 |
| JP | 2002-354716 | A | 12/2002 |
| JP | 2004-222410 | A | 8/2004 |
| JP | 2007-215330 | A | 8/2007 |
| JP | 2008-278551 | A | 11/2008 |
| JP | 2009-254086 | A | 10/2009 |
| JP | 2009254086 | A * | 10/2009 |
| JP | 2010-158095 | A | 7/2010 |
| WO | WO 2008044703 | A1 * | 4/2008 |

OTHER PUBLICATIONS

Uchida et al., English Translation of JP 1995-007896.*
Yoshizawa et al., English Translation of WO 2008/044703.*
International Search Report for International Application No. PCT/JP2011/006829, dated Mar. 13, 2012, 2 pages.
Office Action and Search Report, and partial English language translation thereof, in corresponding Chinese Application No. 201180069041.0, dated Jun. 3, 2015, 9 pages.
Office Action and English language translation of Search Report, in corresponding Chinese Application No. 201180069041.0, dated Jan. 1, 2016, 7 pages.

* cited by examiner

STATOR OF MOTOR HAVING TOOTH PORTIONS WITH DIFFERENT WIDTHS

This application is a 371 application of PCT/JP2011/006829 having an international filing date of Dec. 6, 2011, which claims priority to JP2011-050283 filed Mar. 8, 2011, the entire contents of which are incorporated herein by reference.

TECHNICAL FIELD

The present invention relates to a stator of a motor, and a motor including the stator.

BACKGROUND ART

It is known that as a method of changing a speed of a motor such as a brushless motor (IPM motor) for use in a compressor or the like of air conditioner equipment, a PWM drive method that modulates a pulse width by changing a duty ratio of a pulsed wave based on a particular carrier frequency is used. In the PWM drive method, to attain a waveform of a current flowing through the motor, the pulse width is modulated using the carrier frequency having a higher frequency than the current waveform. Therefore, a higher harmonic component corresponding to the carrier frequency in the PWM is superposed on the current waveform.

A loss of the motor is classified into an iron loss indicating a loss in a case where a core is magnetized and a copper loss indicating a loss caused by an electric resistance of a coil during excitation. The iron loss is a sum of a hysteresis loss attributed to a magnetic characteristic of the core and an eddy-current loss caused by electromagnetic induction inside of the core. It is known that a ratio of the hysteresis loss and a ratio of the eddy-current loss increase as a frequency of alternating magnetic flux (alternating current) for rotating the motor is higher. Because of this, if the higher harmonic component corresponding to the carrier frequency is superposed on the alternating current flowing through the motor, higher harmonic magnetic flux is generated by a current corresponding to the higher harmonic component, resulting in an increase in the iron loss. In particular, the carrier frequency in the PWM drive tends to increase as a size of the brushless motor decreases and an output of the brushless motor increases. Therefore, a reduced efficiency caused by the increase in the iron loss presents severe problems.

As a solution to such a problem, it is known that a yoke of a stator is configured to have portions in which a stress is made different from that of another portion of the yoke, to suppress the higher harmonic magnetic flux generated by the PWM drive (e.g., see Patent Literature 1). Specifically, for example, hollow portions, swaged portions, etc., are provided in an outer peripheral surface or inner peripheral surface of the yoke, and the stator is fastened to an interior of a case by shrink-fit, etc., to increase a compressive stress in the hollow portions, the swaged portions, etc.
Patent Literature 1: Japanese-Laid Open Patent Application Publication No. 2010-158095

SUMMARY OF THE INVENTION

Technical Problem

FIG. 9 is a view showing a result of analysis of a stress distribution in a conventional stator. In FIG. 9, a darker color (darker color tone) represents that an applied stress is greater. As can be seen from FIG. 9, in the conventional stator fastened to the interior of the case by shrink-fit, etc., like that disclosed in Patent Literature 1, portions of the yoke which are higher in compressive stress than teeth located inward relative to the yoke are applied with a greater stress by the above stated portions in which the stress is made different.

However, a problem has been pointed out, in which if the stress inside of the yoke increases in the stator fastened to the interior of the case by shrink-fit, the iron loss significantly increases irrespective of the frequency of the alternating magnetic flux (e.g., Mitsuhiko Sato, Seiichi Kaneko, Mutsuo Tomita, Shinji Doki, Shigeru Okuma "Stator Shape Improvement to Decrease Iron Loss Caused by Shrink Fit, Utilizing Physical Properties of Electrical Steel Sheet" The transactions of the Institute of Electrical Engineers of Japan. D (see IEEJ Trans. IA, Vol. 127, No. 1, 2007 pp. 60-68)). Therefore, if the compressive stress in the yoke is increased by using the configuration of Patent Literature 1, the iron loss may increase as a whole even though the higher harmonic magnetic flux in a localized region can be suppressed.

The present invention is directed to solving the above described problem associated with the prior art, and an object of the present invention is to provide a stator of a motor which is capable of reducing an iron loss generated in a motor to attain a high-efficient motor, and a motor including the stator.

Solution to Problem

According to an aspect of the present invention, a stator of a motor comprises a yoke of a tubular shape; and teeth each of which includes an extending portion extending inward in a radial direction (hereinafter will be simply referred to as radially) of the yoke from the yoke and an increased-width portion formed at a tip end of the extending portion so as to have a greater width than the extending portion in a circumferential direction (hereinafter will be simply referred to as circumferential) of the yoke; wherein the extending portion has a narrower portion having a smaller width than a remaining portion of the extending portion.

In accordance with this configuration, since the narrower portion having a smaller width than the remaining portion of the extending portion is provided in a portion of each of the teeth, a density of magnetic flux flowing through the narrower portion in each of the teeth increases, and local magnetic saturation occurs in the narrower portion, so that higher harmonic magnetic flux is filtered in the narrower portion. In this case, since no stress is generated in the tooth, it becomes possible to prevent a situation in which an iron loss increases due to an increase in a compressive stress exerted on the stator. In addition, since the narrower portion is provided in each of the teeth which is relatively higher in magnetic flux density in the stator, only the higher harmonic magnetic flux can be filtered and removed appropriately. As a result, the iron loss generated in a motor can be reduced, and hence a high-efficiency motor can be attained.

The narrower portion may have a circumferential width which is smaller than a circumferential width of a remaining portion of the extending portion.

The extending portion may have a constant-width portion extending radially in a straight-line shape so as to have a constant circumferential width, and the narrower portion having the circumferential width which is smaller than the circumferential width of the constant-width portion. In this configuration, the constant-width portion allows the alternating magnetic flux to easily flow therethrough and the narrower portion having a smaller circumferential width than the constant-width portion allows the higher harmonic magnetic flux to be suppressed effectively.

The narrower portion may be provided at a base end portion of the extending portion; and the constant-width portion may extend radially inward from a tip end of the narrower portion. This makes it possible to filter higher harmonic magnetic fluxes of adjacent teeth which are interlinked via the yoke. Therefore, the higher harmonic magnetic flux can be suppressed effectively.

Circumferential both end portions of the narrower portion may have a circular-arc shape in a cross-section perpendicular to a center axis of the yoke. With this shape, the magnetic flux flows gently in the narrower portion and a change amount of magnetic vectors in a connection portion at which the narrower portion is connected to another portion is reduced. As a result, an increase in the iron loss can be suppressed.

A ratio of a smallest value d1 of the circumferential width of the narrower portion with respect to a circumferential width d2 of the constant-width portion may be $0.70 < d1/d2 < 0.98$. With this ratio, the higher harmonic magnetic flux can be suppressed more effectively.

According to another aspect of the present invention, a motor comprises the stator of the motor having the above configuration. In this configuration, the iron loss can be reduced without reducing the torque constant in the motor of an equal size, and as a result, a high-efficiency motor can be attained.

The above and further objects and features of the invention will more fully be apparent from the following detailed description with accompanying drawings.

Advantageous Effects of Invention

The present invention has been configured as described above, and has advantages that an iron loss generated in a motor can be reduced, and as a result, a high-efficient motor can be attained.

DETAILED DESCRIPTION OF THE PREFERRED EMBODIMENTS

Figure 1:
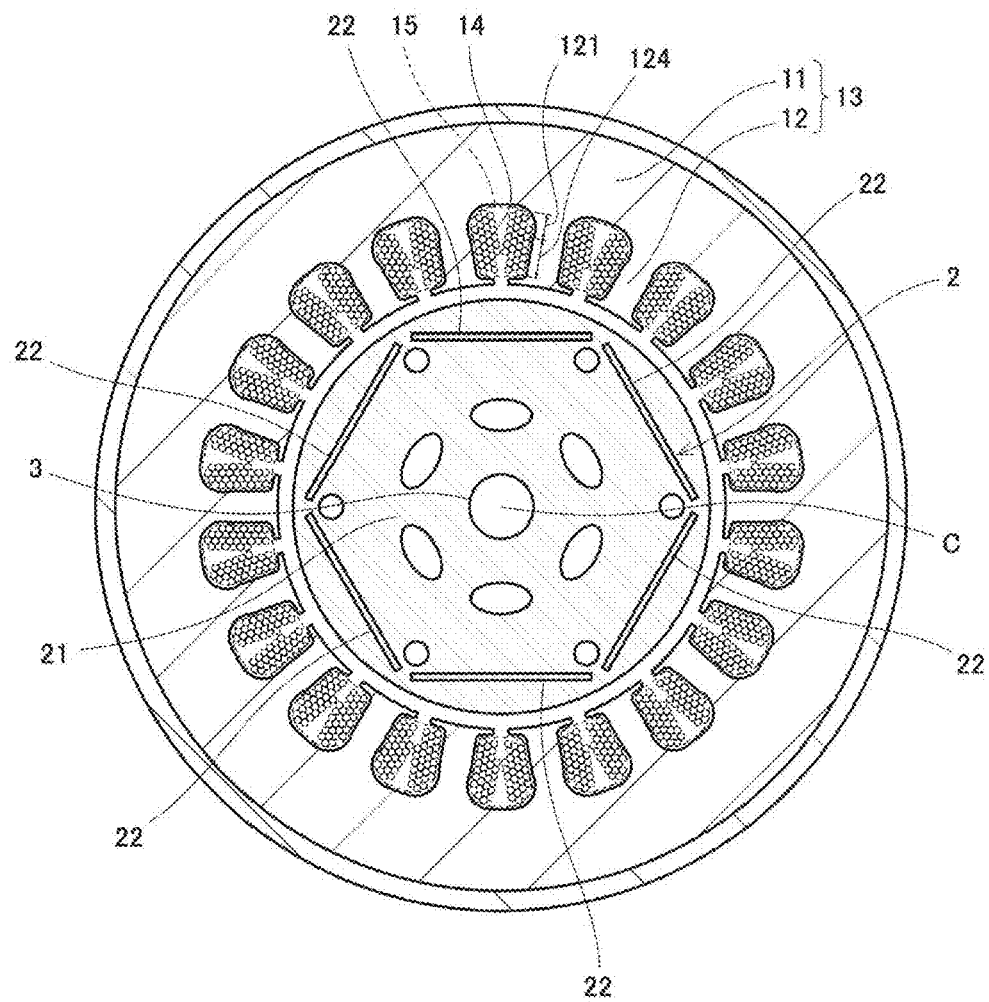
FIG. 1 is a cross-sectional view showing an example of a cross-sectional structure of a motor including a rotor of a motor according to an embodiment of the present invention.

Hereinafter, an embodiment of the present invention will be described with reference to the drawings. Throughout the drawings, the same or corresponding components are designated by the same reference numerals and will not be described in repetition.

FIG. 1 is a cross-sectional view showing an example of a cross-sectional structure of a motor including a rotor of a motor according to an embodiment of the present invention. Hereinafter, a case where the motor is a brushless motor will be exemplarily described, but the motor is not limited to this. As shown in FIG. 1, the brushless motor (hereinafter will be simply referred to as a motor) according to the present invention includes a tubular stator 1 attached to an inner wall surface of an outer frame 10 by shrink-fit, etc., and a tubular rotor 2 retained at an inner side of the stator 1 such that the rotor 2 is rotatable with respect to the stator 1. The rotor 2 is provided with a shaft hole 3 in a center portion thereof. In a state in which a shaft (not shown) is inserted into the shaft hole 3, the rotor 2 and the shaft are fastened to each other.

The stator 1 includes a stator core 13 including a yoke 11 of a tubular shape and a plurality of (18 in the present embodiment) teeth 12 extending radially inward from an inner wall surface of the yoke 11, and coils 14 wound around the teeth 12, respectively. Between each of the teeth 12, i.e., tooth 12 and the corresponding coil 14, an insulating member 15 (see FIG. 2 as will be described later) is provided to electrically insulate them from each other. The rotor 2 includes a tubular rotor core 21 and plate-shaped permanent magnets 22 embedded into a plurality of (six in the present embodiment) slots formed in a circumferential direction of the rotor 2 inside of the rotor core 21. Although the coils 14 are exemplarily illustrated as concentrated winding formed by winding the wire around one tooth 12, the present invention is not limited to this. For example, various winding methods, such as distributed winding or wave winding, which winds the wire around a plurality of teeth 12 may be used.

In the motor configured as described above, when an alternating current is flowed through the coils 14 of the stator 1 to generate rotational magnetic flux, the shaft and the rotor 2 rotate around a rotational axis C which is a center axis of the shaft, with respect to the stator 1.

Figure 2:
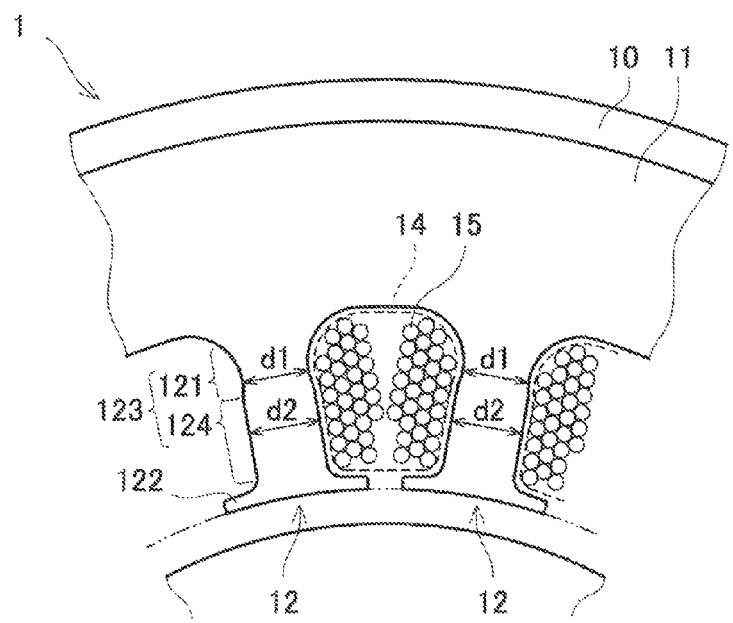
FIG. 2 is a partially enlarged view showing a cross-sectional structure of the stator of the motor of FIG. 1.

FIG. 2 is a partially enlarged view showing a cross-sectional structure of the stator of the motor of FIG. 1. In FIG. 2, representation of a part of the coils 14 and the insulating members 15 is omitted. As shown in FIG. 2, each of the teeth 12, i.e., tooth 12 has a narrower portion 121 having a smaller width than the remaining portion of the tooth 12. Specifically, the tooth 12 has an extending portion 123 extending inward in a radial direction (hereinafter will be simply referred to as radially) of the yoke 11 from the yoke 11 and an increased-width portion 122 formed at a tip end of the extending portion 123 so as to have a greater width than the extending portion 123 in a circumferential direction (hereinafter will be simply referred to as circumferential) of the yoke 11. The extending portion 123 is formed such that its circumferential width is smaller than the circumferential width of the increased-width portion 122. The extending portion 123 is called a magnetic-pole portion, while the increased-width portion 122 is called a magnetic-pole tip end portion. The extending portion 123 has a constant-width portion 124 extending radially in a straight-line shape so as to have a constant circumferential width, and the narrower portion 121 in which its circumferential width d1 is smaller than a circumferential width d2 of the constant-width portion 124. Thus, the narrower portion 121 is formed in a portion of the extending portion 123 such that the circumferential width of the narrower portion 121 is smaller than the circumferential width of the remaining portion of the extending portion 123.

Figure 3:
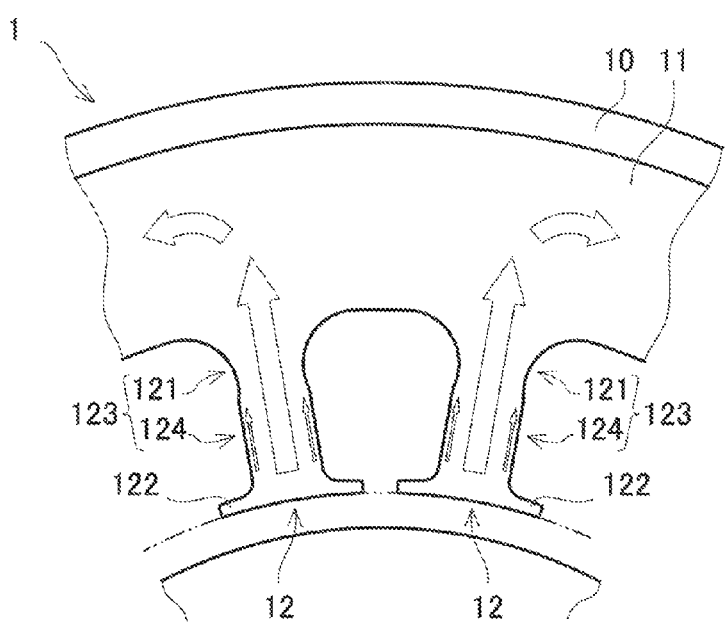
FIG. 3 is a view showing flows of localized portions of magnetic flux in the vicinity of teeth in the stator of the motor of FIG. 1.

Next, advantages provided by the stator 1 configured as described above will be described. FIG. 3 is a view showing flows of localized portions of the magnetic flux in the vicinity of teeth in the stator of the motor of FIG. 1. In FIG. 3, temporal flows of the magnetic flux are indicated by arrows. In FIG. 3, representation of the coils 14 and the insulating members 15 is omitted. As shown in FIG. 3, the magnetic flux from the rotor 2 flows from the increased-width portion 122 of the tooth 12 into the tooth 12, and further flows to the yoke 11 through the extending portion 123 of the tooth 12. Since the magnetic flux flowing through the tooth 12 is alternating magnetic flux, the magnetic flux may flow in the same manner in directions opposite to the arrows of FIG. 3 (the magnetic flux flowing in the direction from the yoke 11 toward the rotor 2 through the tooth 12 occurs).

Since the narrower portion 121 having a smaller width than the remaining portion of the tooth 12 is provided in a portion of the tooth 12 such that the width of the narrower portion 121 is smaller than the width of the remaining portion of the tooth 12, a density of the magnetic flux flowing through the narrower portion 121 in the tooth 12 increases, and local magnetic saturation occurs in the narrower portion 121, so that the higher harmonic magnetic flux is filtered in the narrower portion 121. More specifically, when the alternating magnetic flux (main magnetic flux) passing through the tooth 12 becomes a local maximum value, a higher harmonic component superposed on the alternating magnetic flux is removed. Because of this, a cross-sectional area of the narrower portion 121 which is perpendicular to a radial direction thereof (direction in which the alternating magnetic flux flows) is desirably sized to allow all of the main magnetic flux which is as much as possible to pass through the narrower portion 121, in the local maximum value of the alternating magnetic flux.

Figure 9:
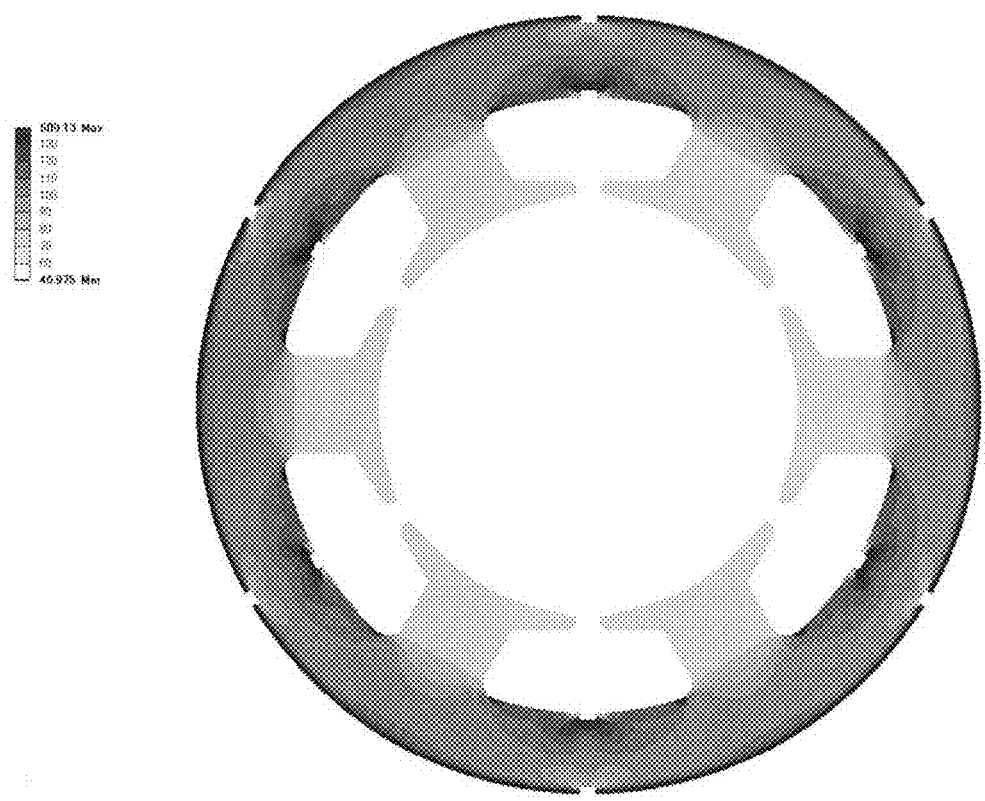
FIG. 9 is a view showing a result of analysis of a stress distribution in a conventional stator.

As shown in the conventional configuration of FIG. 9, a stress due to shrink-fit, etc., is not generated in the tooth 12. Therefore, even when the narrower portion 121 is provided in the tooth 12, a stress exerted on the stator 1 will not increase. Therefore, it becomes possible to prevent a situation in which an iron loss increases due to an increase in a compressive stress exerted on the stator 1. In addition, since the narrower portion 121 is provided in the tooth 12 which is relatively higher in magnetic flux density in the stator 1, only the higher harmonic magnetic flux can be filtered and removed appropriately. Thus, the higher harmonic component of the alternating magnetic flux passing through inside of the tooth 12 is removed to reduce iron loss while reduction of an output (torque constant) can be prevented by causing the main magnetic flux to pass through inside of the tooth 12. As a result, an iron loss generated in a motor can be reduced, and hence a high-efficiency motor can be attained.

Because of the increased-width portion 122, a leakage of the magnetic flux which occurs when the magnetic flux from the rotor 2 is flowing through the stator 1 is reduced. Besides, the higher harmonic magnetic flux is filtered in the narrower portion 121 having a smaller width than the increased-width portion 122. Therefore, the higher harmonic magnetic flux can be suppressed effectively without reducing the torque constant of the motor. Furthermore, since the constant-width portion 124 is formed in the portion of the extending portion 123 which is other than the narrower portion 121, the higher harmonic magnetic flux can be suppressed effectively in the narrower portion 121 having a smaller circumferential width than the constant-width portion 124 while mitigating the magnetic saturation of the alternating magnetic flux in the constant-width portion 124.

The narrower portion 121 in the present embodiment will be described in more detail. As shown in FIG. 2, the narrower portion 121 is provided at a base end portion (portion near the yoke 11) of the extending portion 123, and the constant-width portion 124 extends radially inward from the tip end of the narrower portion 121. This makes it possible to filter higher harmonic magnetic fluxes of adjacent teeth 12 which are interlinked via the yoke 11. Therefore, the higher harmonic magnetic flux can be suppressed effectively.

The circumferential both end portions of the narrower portion 121 have a circular-arc shape in a cross-section perpendicular to a center axis of the yoke 11. That is, the circular-arc shape is such that the circumferential width of the tooth 11 decreases from the base end portion (portion near the yoke 11) toward the tip end thereof, reaches the smallest circumferential width d1, and then increases to be close to a circumferential width d2 toward the tip end. Thereby, the magnetic flux flows gently in the narrower portion 121 and a change amount of magnetic vectors in a connection portion at which the narrower portion 121 is connected to another portion (the constant-width portion 124 or the yoke 11) is reduced. As a result, an increase in the iron loss can be suppressed by the narrower portion 121.

Figure 4:
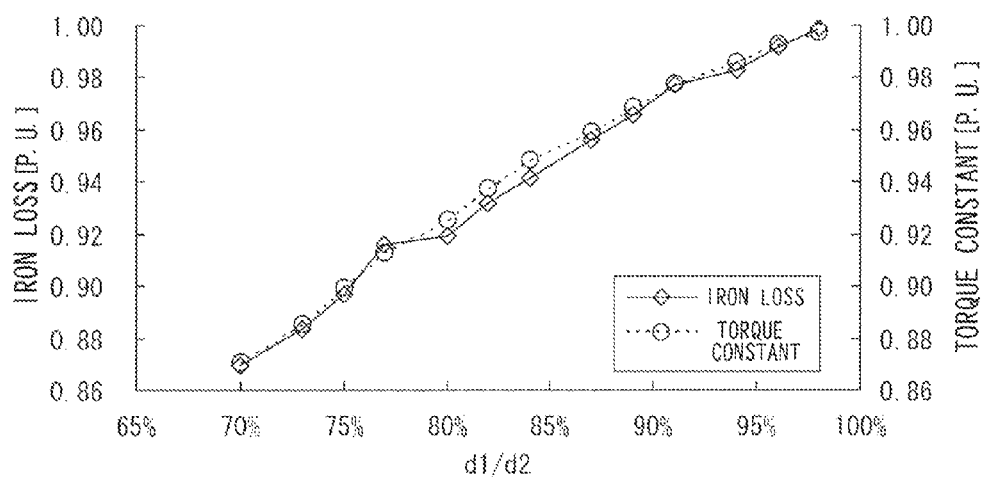
FIG. 4 is a graph showing analysis values of an iron loss and a torque constant in a case where the smallest value d1 of a circumferential width of a narrower portion of each of the teeth is changed with respect to a circumferential width d2 of a constant-width portion in the stator of FIG. 1.
Figure 5:
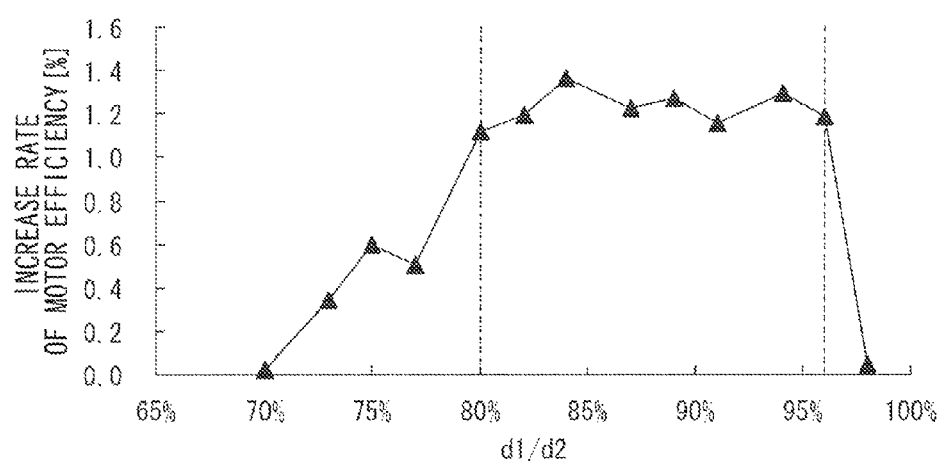
FIG. 5 is a graph showing an analysis value of a motor efficiency in a case where the smallest value d1 of the circumferential width of the narrower portion of each of the teeth is changed with respect to the circumferential width d2 of the constant-width portion in the stator of FIG. 1.

Preferably, a ratio of the smallest value d1 of the circumferential width of the narrower portion 121 with respect to the circumferential width d2 of the constant-width portion 124 is $0.70 < d1/d2 < 0.98$. FIG. 4 is a graph showing analysis values of an iron loss and a torque constant in a case where the smallest value d1 of the circumferential width of the narrower portion of each of the teeth is changed with respect to the circumferential width d2 of the constant-width portion in the stator of FIG. 1. FIG. 4 indicates a decrease rate of the iron loss and a decrease rate of the torque constant when the iron loss and the torque constant in a case where there exists no narrower portion (case where the circumferential width from the base end of the extending portion to the tip end of the extending portion is constant) are 1. FIG. 5 is a graph showing an analysis value of a motor efficiency in a case where the smallest value d1 of the circumferential width of the narrower portion of each of the teeth is changed with respect to the circumferential width d2 of the constant-width portion, in the stator of FIG. 1. FIG. 5 shows an increase rate of the motor efficiency from the motor efficiency in the case where there exists no narrower portion (case where the circumferential width from the base end of the extending portion to the tip end of the extending portion is constant). FIGS. 4 and 5 show graphical representation of the analysis values when the smallest value d1 of the circumferential width of the narrower portion is changed from 0.7d2 (70%) to 0.98d2 (98%) width respect to the circumferential width d2 of the constant-width portion.

The motor efficiency η is represented by a ratio of a motor output Pout with respect to a motor input Pin (Pout/Pin), and the motor output Pout is a value derived by subtracting a motor loss Ploss from the motor input Pin. Therefore, the motor efficiency η is expressed as η=(Pin−Ploss)/Pin. The motor loss Ploss is a sum of an iron loss Wf and a copper loss Wc (Wf+Wc), and the copper loss Wc is expressed as Wc=I$^2$·R using a motor current I and a winding resistance R of the coil 14. A torque τ of the motor is expressed as τ=Kτ·I using a torque constant Kτ, and therefore the motor current I is expressed as τ/Kτ. Therefore, the motor efficiency η is expressed as η=1−(Wf+(τ/K)$^2$·R)/Pin. From this, it may be said that when the iron loss Wf decreases and the torque constant Kτ increases, the motor efficiency η increases.

As shown in FIG. 4, when a ratio of the smallest value d1 of the circumferential width of the narrower portion 121 with respect to the circumferential width d2 of the constant-width portion 124 is equal to or greater than 98% (0.98≤d1/d2≤1.0), an effect of reducing the iron loss is not provided, whereas when the ratio of the smallest value d1 with respect to the circumferential width d2 is less than 98%, the effect of reducing the iron loss is provided. As the smallest value d1 of the circumferential width of the narrower portion 121 is smaller with respect to the circumferential width d2 of the constant-width portion 124 in the case where the smallest value d1 of the circumferential width of the narrower portion 121 with respect to the circumferential width d2 of the constant-width portion 124 is less than 98%, the iron loss is reduced more, but the torque constant is reduced. When considering the motor efficiency with reference to FIG. 5, in a case where the ratio of the smallest value d1 of the circumferential width of the narrower portion 121 with respect to the circumferential width d2 of the constant-width portion 124 is equal to or less than 70%, the iron loss is reduced, but an adverse effect resulting from reduction of the torque constant is noticeable as compared to an effect provided by reduction of the iron loss (i.e., the copper loss is increased), so that the motor efficiency is not increased (the increase rate of the motor efficiency is 0).

In view of the above, by setting the ratio of the smallest value d1 of the circumferential width of the narrower portion 121 with respect to the circumferential width d2 of the constant-width portion 124 to 0.70<d1/d2<0.98, the iron loss can be reduced without reducing the torque constant in a motor of an equal size, and as a result, a high-efficiency motor can be attained. In particular, when the ratio of the smallest value d1 of the circumferential width of the narrower portion 121 with respect to the circumferential width d2 of the constant width portion 124 is in a range of 0.80<d1/d2<0.96, the increase rate of the motor efficiency becomes greater. Therefore, by setting the ratio of d1/d2 to this range, the motor efficiency can be further increased.

Although in the present embodiment, the narrower portion 121 is provided at the base end side of the extending portion 123 of the tooth 12, the present invention is not limited to this. FIGS. 6A to 6E are partially enlarged views showing examples of the cross-sectional structures of the stator according to modified examples of Embodiment 1 of the present invention. In FIGS. 6A to 6E, representation of the coils 14 and the insulating members 15 is omitted.

Figure 6A:
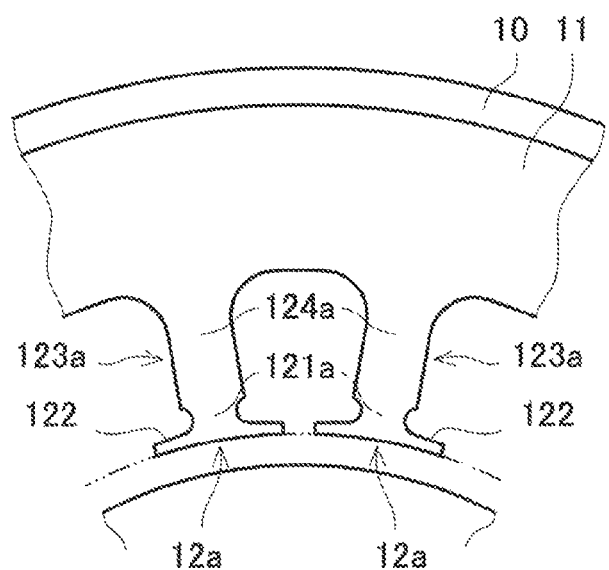
FIG. 6A is a partially enlarged view showing an example of a cross-sectional structure of a stator according to a modified example of Embodiment 1 of the present invention.

In the modified example of FIG. 6A, a narrower-portion 121a is provided at a tip end side (location distant from the yoke 11) of an extending portion 123a of a tooth 12a. Specifically, the extending portion 123a includes a constant-width portion 124a extending radially inward from the yoke 11 and the narrower-portion 121a provided between the constant-width portion 124a and the increased-width portion 122 at the tip end.

Figure 6B:
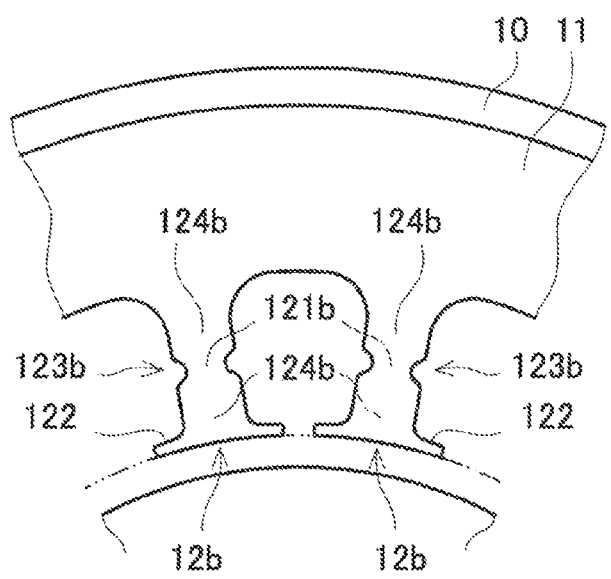
FIG. 6B is a partially enlarged view showing an example of a cross-sectional structure of a stator according to a modified example of Embodiment 1 of the present invention.

In the modified example of FIG. 6B, a narrower-portion 121b is provided at an intermediate portion of an extending portion 123b of a tooth 12b. Specifically, the extending portion 123b has constant-width portions 124b provided at radially both sides of the narrower-portion 121b so as to extend in the radial direction of the yoke 11.

Figure 6C:
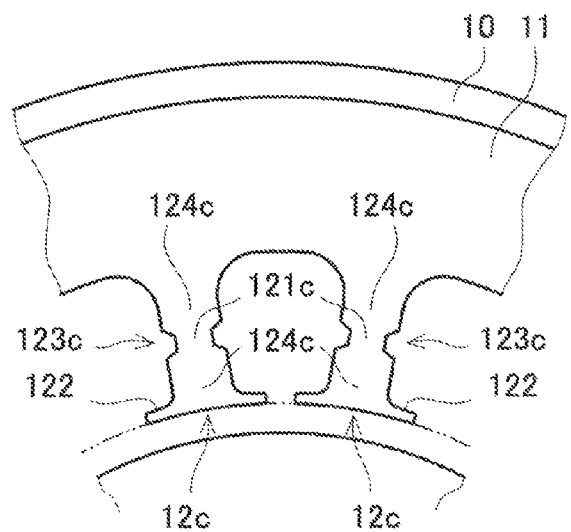
FIG. 6C is a partially enlarged view showing an example of a cross-sectional structure of a stator according to a modified example of Embodiment 1 of the present invention.

In the modified example of FIG. 6C, circumferential both end portions of a narrower-portion 121c of an extending portion 123c, in the cross-section perpendicular to the center axis of the yoke 11, have an angular shape. In the present modified example, like the modified example of FIG. 6B, a tooth 12c has constant-width portions 124c provided at radially both sides of the narrower-portion 121c, so as to extend in the radial direction of the yoke 11. The shape of the narrower-portion 121c in the present modified example is applicable to the narrower-portions shown in FIGS. 2 and 6A.

Figure 6D:
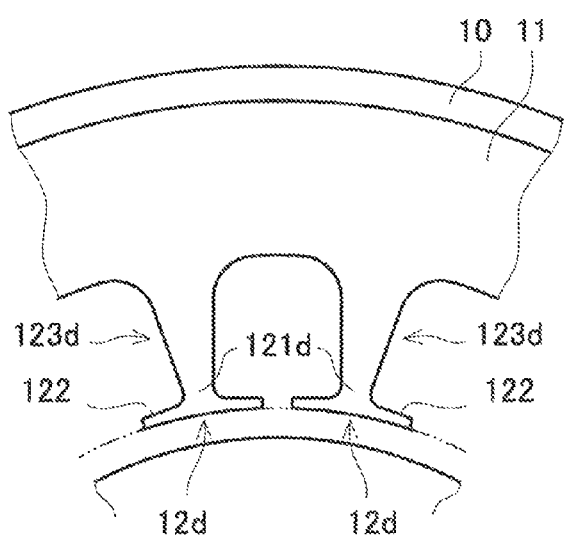
FIG. 6D is a partially enlarged view showing an example of a cross-sectional structure of a stator according to a modified example of Embodiment 1 of the present invention.

In the modified example of FIG. 6D, an extending portion 123d of a tooth 12d has a shape in which its circumferential width decreases as it extends radially inward relative to the yoke 11. This allows a narrower-portion 121d to be formed, in which a circumferential width of a tip end portion of the extending portion 123d is smaller than that of the remaining portion of the extending portion 123d.

Figure 6E:
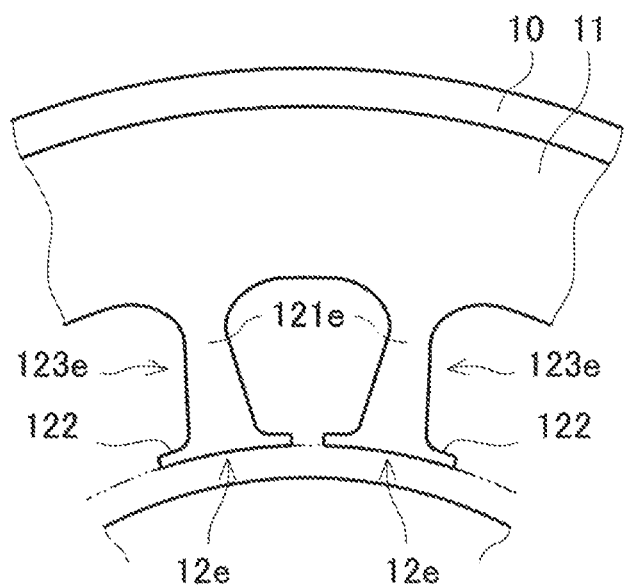
FIG. 6E is a partially enlarged view showing an example of a cross-sectional structure of a stator according to a modified example of Embodiment 1 of the present invention.

In the modified example of FIG. 6E, an extending portion 123e of a tooth 12e has a shape in which its circumferential width increases as it extends radially inward relative to the yoke 11. This allows a narrower-portion 121e to be formed, in which a circumferential width of a base end portion of the extending portion 123e is smaller than that of the remaining portion of the extending portion 123e.

The above described modified examples can achieve advantages similar to those of the above described embodiment.

Example 1

Hereinafter, a description will be given of results of analysis of the iron loss and the torque constant, for the stator (Example 1) provided with the narrower-portions 121 described in the above embodiment, in the teeth 12 of the stator 1, and stators which were not provided with narrower-portions in teeth (Comparative example 1, Comparative example 2). As the comparative examples, used were a stator comprising teeth each including a constant-width portion extending in a radial direction of a yoke and a tip end portion having a greater width than the constant-width portion such that the circumferential width of the constant-width portion was equal to d2 described with reference to FIG. 4 (Comparative example 1), and a stator comprising teeth each including a constant-width portion extending in a radial direction of a yoke and a tip end portion having a greater width than the constant-width portion such that the circumferential width of the constant-width portion was 0.93d2 (Comparative example 2). As Example 1, used was the stator 1 in which the circumferential width of the constant-width portion 124 was the above d2 and the circumferential width of the narrower portion 121 was 0.93d2. The other configurations of the stator (number of teeth, width of the yoke, etc.) were identical among Example 1, Comparative example 1 and Comparative example 2.

Figure 7:
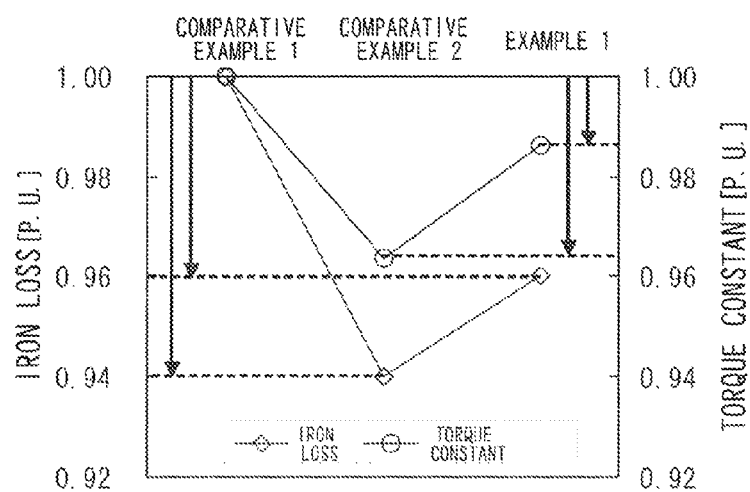
FIG. 7 is a graph showing analysis values of an iron loss and a torque constant of a stator of Example 1 of the present invention in comparison with those of comparative examples.

FIG. 7 is a graph showing analysis values of the iron loss and the torque constant of the stator in Example 1 of the present invention in comparison with those of comparative examples. FIG. 7 indicates a decrease rate of the iron loss and a decrease rate of the torque constant in each of Comparative example 2 and Example 1 when the iron loss and the torque constant in Comparative example 1 were 1.

As shown in FIG. 7, the iron loss in Comparative example 2 was about 6% less than the iron loss in Comparative example 1. From this, it was found that the iron loss could be reduced by reducing the circumferential width of the teeth. However, in this case, the torque constant in Comparative example 2 was about 4% less than the torque constant in Comparative example 1, which resulted in a case where the motor efficiency could not be increased.

On the other hand, as shown in FIG. 7, the iron loss in Example 1 was about 4% less than the iron in Comparative example 1, while the torque constant in Example 1 was about 1% less than the torque constant in Comparative example 1. From this, it was revealed that a high-efficiency motor was implemented, which could reduce the iron loss while preventing reduction of an output of the motor, by providing the narrower portions 121 in the teeth 12.

Figure 8:
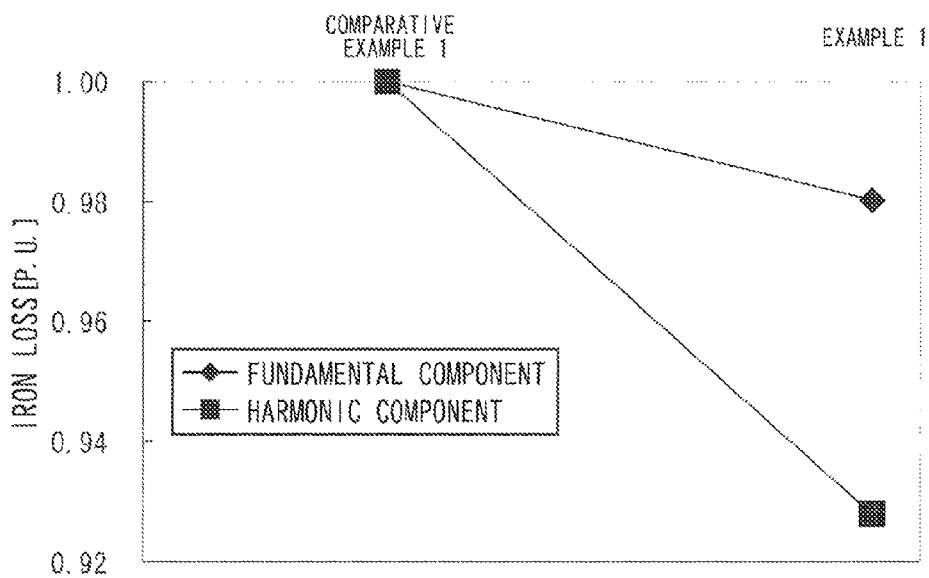
FIG. 8 is a graph showing the analysis values of the iron loss of the stator of Example 1 of the present invention, for respective frequency components.

Furthermore, it was verified by analysis that the iron loss made less in Example 1 than in Comparative example 1 was associated with the higher harmonic component (higher harmonic magnetic flux) or associated with a fundamental component (main magnetic flux), using their decrease rates. FIG. 8 is a graph showing the analysis values of the iron loss of the stator of Example 1 of the present invention, for respective frequency components. FIG. 8 indicates the decrease rate of the iron loss associated with the fundamental component and the decrease rate of the iron loss associated with the higher harmonic component in Example 1, in a case where the iron loss associated with the fundamental component and the iron loss associated with the higher harmonic component in Comparative example 1 were 1.

As shown in FIG. 8, the iron loss associated with the fundamental component and the iron loss associated with the higher harmonic component were less in Example 1 than in Comparative example 1. The decrease rate of the iron loss associated with the fundamental component was as small as about 2%, while the decrease rate of the iron loss associated with the higher harmonic component was as great as 7%. Therefore, it was revealed that by providing the narrower portions 121 in the teeth 12, the iron loss associated with the higher harmonic magnetic flux could be suppressed effectively, while maintaining the main magnetic flux.

Thus far, the embodiment of the present invention has been described. The present invention is not limited to the above embodiment and the embodiment can be improved, changed or modified in various ways without departing from a spirit of the invention.

Although in the above embodiment, for example, the narrower-portions 121 are provided at both sides of each of the teeth 12 in the circumferential direction of the yoke 11, the present invention is not limited to this. For example, the narrower-portion 121 may be provided at one side of each of the teeth 12 in the circumferential direction of the yoke 11. Or, in addition to or instead of the narrower portions formed in the circumferential direction, narrower-portions may be provided at both sides of each of the teeth 12 in a center axis direction of the yoke 11.

Although in the above embodiment, the narrower-portions 121 are provided in all of the teeth 12 included in the stator 1, the present invention is not limited to this. The narrower-portions 121 may be provided in some of the plurality of teeth 12.

The number of the teeth 12, another shape of the teeth 12, the shape of the yoke 11, etc., may be suitably set.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention and all modifications which come within the scope of the appended claims are reserved.

INDUSTRIAL APPLICABILITY

A stator of a motor of the present invention and a motor including the stator are useful in reduction of an iron loss generated in a motor and achievement of a high-efficient motor.

The invention claimed is:
1. A stator of a motor comprising:
a yoke of a tubular shape; and
teeth each extending radially inwardly from the yoke, each tooth having an extending portion and an increased-width portion formed at a tip end of the extending portion and having a greater circumferential width than that of the extending portion;
wherein the extending portion has (i) a constant-width portion extending radially in a straight line shape with a circumferential width (d2) which is constant along a radial length of the constant-width portion and (ii) a narrower portion formed with a pair of grooves of an arcuate cross-section running axially at the same radial height in both of circumferential end surfaces of the extending portion, the narrower portion having a smallest width (d1) at bottoms of the arcuate grooves which is smaller than the circumferential width (d2) of the constant-width portion,
wherein the narrower portion has a circumferential cross-section at the bottoms of the arcuate grooves that is configured large enough to pass a main alternating magnetic flux therethrough without causing magnetic saturation to the main alternating magnetic flux at local maxima of the main alternating flux, while configured small enough to cause magnetic saturation at the narrower portion to a high harmonic magnetic flux, which is superimposed on the main alternating magnetic flux by influence of a high frequency carrier signal used for

PWM (Pulse With Modulation), to thereby filter out the high harmonic magnetic flux at the narrower portion, and further wherein the narrower portion is configured such that a ratio between the smallest width (d1) and the circumferential width (d2) is within a range of 0.70<d1/d2<0.98, which is a function of a torque constant of the motor and an iron loss of the motor both of which decrease as the ratio decreases.

2. The stator of the motor according to claim 1, wherein the narrower portion is provided at a base end portion of the extending portion; and wherein the constant-width portion continues radially inwardly from the narrower portion.

3. A motor including the stator of the motor as recited in claim 1.

* * * * *